United States Patent
Lotz

(10) Patent No.: US 8,427,684 B2
(45) Date of Patent: Apr. 23, 2013

(54) RESOURCE CONFLICT RESOLUTION MECHANISM

(75) Inventor: Michael Glen Lotz, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 402 days.

(21) Appl. No.: 12/814,951

(22) Filed: Jun. 14, 2010

(65) Prior Publication Data

US 2011/0304875 A1    Dec. 15, 2011

(51) Int. Cl.
*G06F 3/12* (2006.01)

(52) U.S. Cl.
USPC ..................................... 358/1.15; 707/999.2

(58) Field of Classification Search .................. 358/1.15; 707/999.2
See application file for complete search history.

(56) References Cited

U.S. PATENT DOCUMENTS

| | | | |
|---|---|---|---|
| 7,515,297 | B2 | 4/2009 | Wardell et al. |
| 2003/0200229 | A1* | 10/2003 | Cazier ........................... 707/200 |
| 2004/0260693 | A1* | 12/2004 | Chen et al. ........................ 707/5 |
| 2005/0024668 | A1 | 2/2005 | Schmidt |
| 2005/0094190 | A1 | 5/2005 | Condon et al. |
| 2008/0198415 | A1* | 8/2008 | Hattori ......................... 358/1.17 |
| 2009/0080025 | A1 | 3/2009 | Aronshtam et al. |
| 2009/0100405 | A1* | 4/2009 | Belenky et al. ............... 717/104 |
| 2009/0251713 | A1 | 10/2009 | Funane |

* cited by examiner

*Primary Examiner* — Qian Yang

(74) *Attorney, Agent, or Firm* — Blakely, Sokoloff, Taylor & Zafman LLP

(57) ABSTRACT

A computer generated method disclosed. The method includes receiving a print job including a plurality of print files, processing a first resource in a first print file by determining if the name of the first resource matches a name of a previously processed resource, determining if data within the first resource matches data within a previously processed resource if the name of the first resource matches the name of the previously processed resource and renaming the first resource if the data within the first resource does not match data within the previously processed resource.

17 Claims, 6 Drawing Sheets

File 1 resources:

CharacterSet C1 - CRC or MD5=1
CodePage    T1 - CRC or MD5=2
CodedFont   X1 which references C1 and T1 by name - CRC or MD5=3
Overlay     O1 which references X1 - CRC or MD5=4
Medium Map M1 - references O1 - CRC and MD5=5

File 2 has Resources:

CharacterSet C1 - CRC or MD5<>1 it is actually =15
CodePage    T1 - CRC or MD5=2
CodedFont   X1 which references C1 and T1 by name - CRC or MD5=3
Overlay     O1 which references X1 - CRC or MD5=4
Medium Map M1 - references O1 - CRC and MD5=5

Figure 4A

File 1 resources:

CharacterSet C1 - CRC or MD5=1
CodePage    T1 - CRC or MD5=2
CodedFont   X1 which references C1 and T1 by name - CRC or MD5=3

File 2 resources in the:

Overlay     O1 which references X1 - CRC or MD5=4
CodePage    T1 - CRC or MD5=2
CodedFont   X1 which references C1 and T1 by name - CRC or MD5=3
CharacterSet C1 - CRC or MD5<>1 it is actually =15

Figure 4B

RESOURCE CONFLICT RESOLUTION MECHANISM

FIELD OF THE INVENTION

The invention relates to the field of printing systems. Particularly, the invention relates to renaming conflicting resources in print job files.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from order entry and management through the complete printing process. The printing software may simultaneously manage in excess of thousands of print jobs that have been spooled (or queued) for production. Each of these print jobs may include a voluminous number (e.g., five hundred) of print files, including text and other resources, which are combined to produce the print job. Moreover, each of these print files may have been received from different entities. As a result, there is a likelihood that the printing software will encounter resources from different print files that have the same name, but with differing data. Such conflicting resources must be resolved prior to printing the print job.

Current systems rename all resources with conflicting names regardless of whether the resources have identical data. However, such a method is not efficient since it requires unnecessary resource processing, especially considering that a print job may include several hundred print files, many of which having in excess of two gigabytes of data.

Accordingly, a mechanism to efficiently resolve resource conflicts in large print jobs is desired.

SUMMARY

In one embodiment a computer generated method is disclosed. The method includes receiving a print job including a plurality of print files, processing a first resource in a first print file by determining if the name of the first resource matches a name of a previously processed resource, determining if data within the first resource matches data within a previously processed resource if the name of the first resource matches the name of the previously processed resource and renaming the first resource if the data within the first resource does not match data within the previously processed resource.

In another embodiment, a print server is disclosed. The print server includes a printing software product that receives a print job including a plurality of print files, processes a first resource in a first print file by determining if the name of the first resource matches a name of a previously processed resource, determines if data within the first resource matches data within a previously processed resource if the name of the first resource matches the name of the previously processed resource; and renames the first resource if the data within the first resource does not match data within the previously processed resource.

BRIEF DESCRIPTION OF THE DRAWINGS

A better understanding of the present invention can be obtained from the following detailed description in conjunction with the following drawings, in which:

FIGS. 4A and 4B illustrate embodiments of print file resources; and

DETAILED DESCRIPTION

A print job resource resolution mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
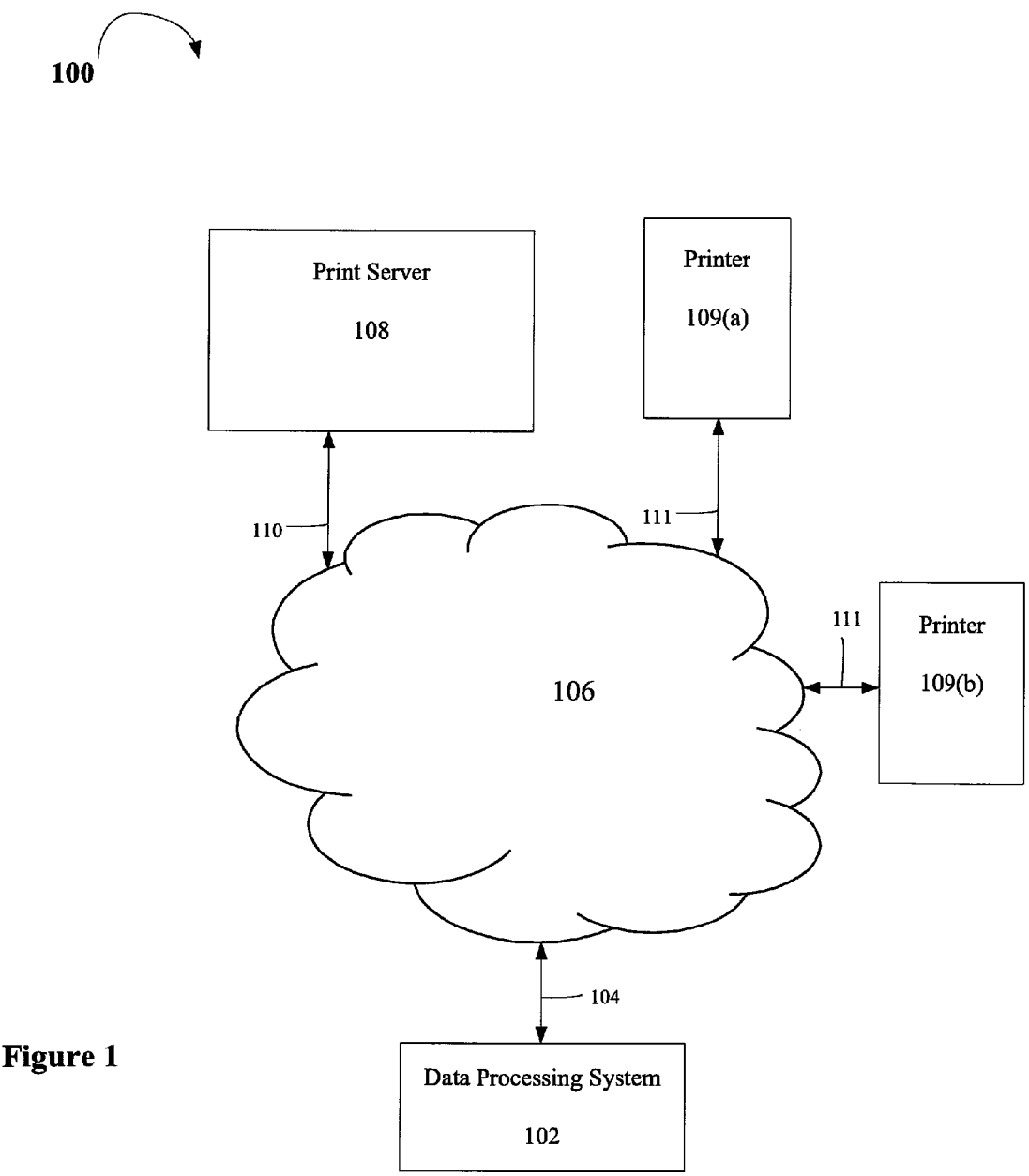
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, a print application at data processing system 102 allows a user to select the desired print server 108 and submit requests for service requests to printer 109 via print server 108 over network 106. In a further embodiment, the print application implements the (Advanced Function Presentation) AFP™ presentation system developed by International Business Machines Corporation to represent documents in a data format that is independent of the methods that are utilized to capture or create those documents.

According to the AFP system, documents may include combinations of text, image, graphics, and/or barcode objects in device and resolution independent formats. Documents may also include and/or reference fonts, overlays, and other resource objects, which are required at presentation time to present the data properly. In other embodiments, additional/alternative presentation architectures may be implemented at the print application.

However in an AFP embodiment, the print application provides a Mixed Object Document Content Architecture (MO:DCA) data stream to print server 108. In such an embodiment, the AFP MO:DCA data streams are object-oriented streams including, among other things, data objects, page objects, and resource objects. In a further embodiment, AFP MO:DCA data streams include a Resource Environment Group (REG) that is specified at the beginning of the AFP document, before the first page. When the AFP MO:DCA data streams are processed by print server 108, the REG structure is encountered first and causes server 108 to download any of the identified resources that are not already present in the printer.

Although described as separate entities, other embodiments may include print server 108 being incorporated in one or more of the printers 109. In yet further embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 and one or more of printers 109. In other embodiments, the printing software product manages printing of documents from multiple data processing systems 102 to the one or more printers 109. In one embodiment, the printing software product may be implemented using either InfoPrint Manager (IPM) or InfoPrint ProcessDirector (IPPD), although other types of printing software may be used instead. In a further embodiment, the print application at data processing system 102 interacts with the printing software product to provide for efficient transmission of print jobs.

In one embodiment, the printing software product includes a resource conflict resolution mechanism that identifies MO:DCA resources from different print files having identical names, determines if the resources have conflicting data and renames one of the resources if appropriate. In a further embodiment, the conflict resolution mechanism performs a cascade rename process once a resource is renamed in order to rename resources (e.g., overlay callouts) that refer to a renamed resource.

Figure 2:
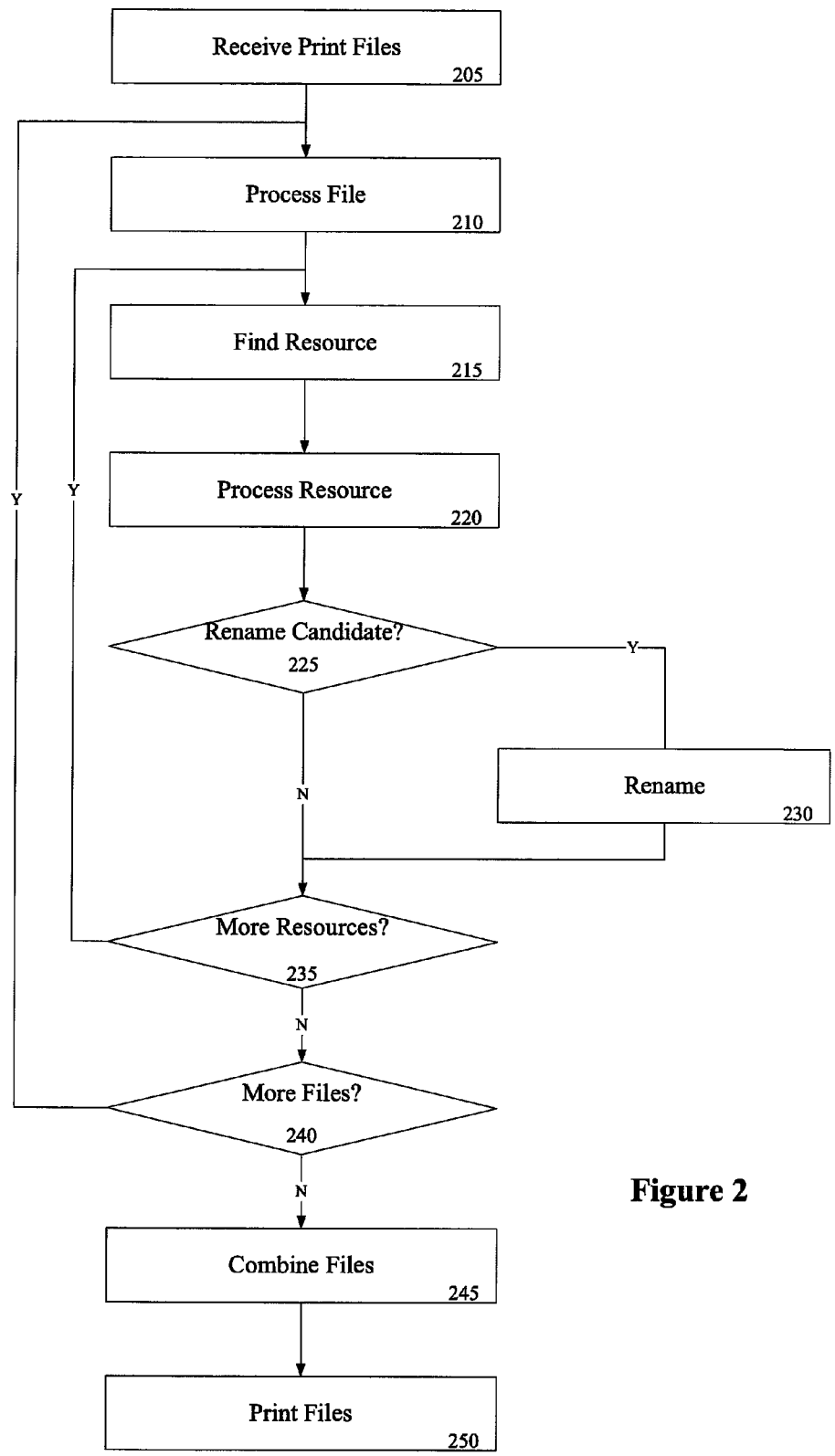
FIG. 2 is a flow diagram illustrating one embodiment of a conflict resolution process.

FIG. 2 is a flow diagram illustrating one embodiment of a conflict resolution process performed on files within a print job. At processing block 205, a print job is received at print server 108 in the form of print files. At processing block 210, a first print file is processed by the printing software product. At processing block 215, a resource within the print file is found. The resource then begins to be processed by the printing software product, processing block 220.

At decision block 225, it is determined whether the resource is a candidate to be renamed. In one embodiment, a resource is a candidate to be renamed if the resource is a Coded Font, Character Set, Code Page, Page Segment, Object Container, and Overlay. If the resource is a candidate to be renamed, a rename process is performed, processing block 230.

Figure 3A:
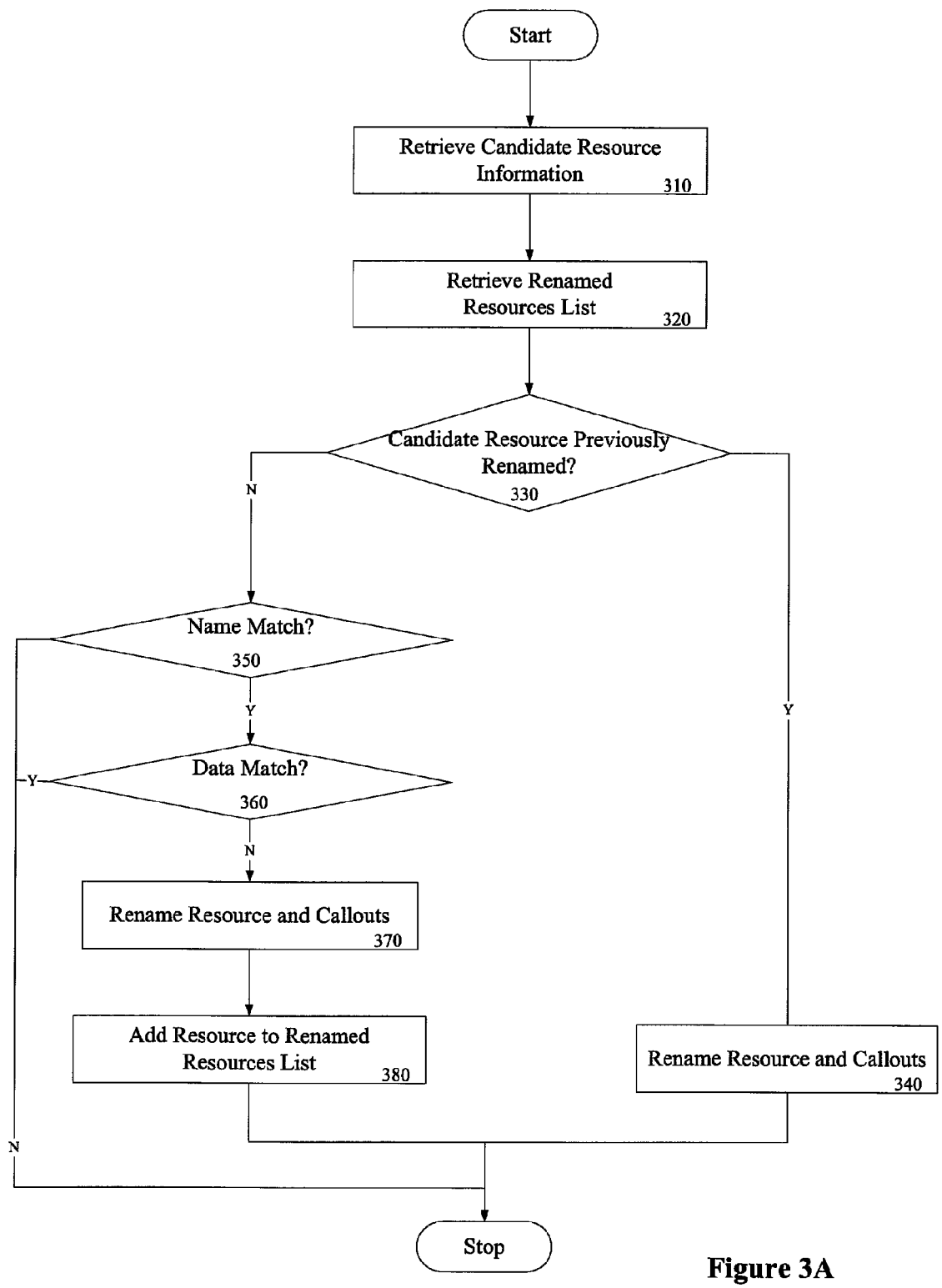
FIG. 3A and 3B are flow diagrams illustrating embodiments of a resource renaming process.

FIG. 3A is a flow diagram illustrating one embodiment of a resource rename process. At processing block 310, information for the candidate resource is retrieved from memory. At processing block 320, a list of previously renamed resources are also retrieved. This list is used to compare against the candidate resource to determine if the candidate resource is identical to a resource (e.g., name and data) that has already been renamed. If at decision block 330 it is determined that the candidate resource is identical to a resource that has already been renamed, the resource is renamed using the name of the identical resource on the list, processing block 340. Further, all callouts to the resource are also renamed.

If at decision block 330 it is determined that the candidate resource has not previously been renamed, it is determined whether there is an exact match between the name of the candidate resource and a name of another resource in a file that has previously been processed, decision block 350. If there is no name match, it is not necessary to rename the candidate resource and the resource rename process is terminated.

If however, there is an exact match between the name of the candidate resource and another previously processed resource, it is determined whether there is also a match between the data of the candidate resource and the resource with the identical name, decision block 360. If the data is a match, it is not necessary to rename the candidate resource and the resource rename process is terminated. Otherwise, the resource is renamed, processing block 370.

In one embodiment, the renaming resource process includes generating a new unique name for the resource and changing the name of the resource to the new name. Additionally, all callouts to the renamed resource are renamed. At processing block 380 the renamed resource is added to the list of previously renamed resources and the resource rename process is terminated.

Figure 3B:
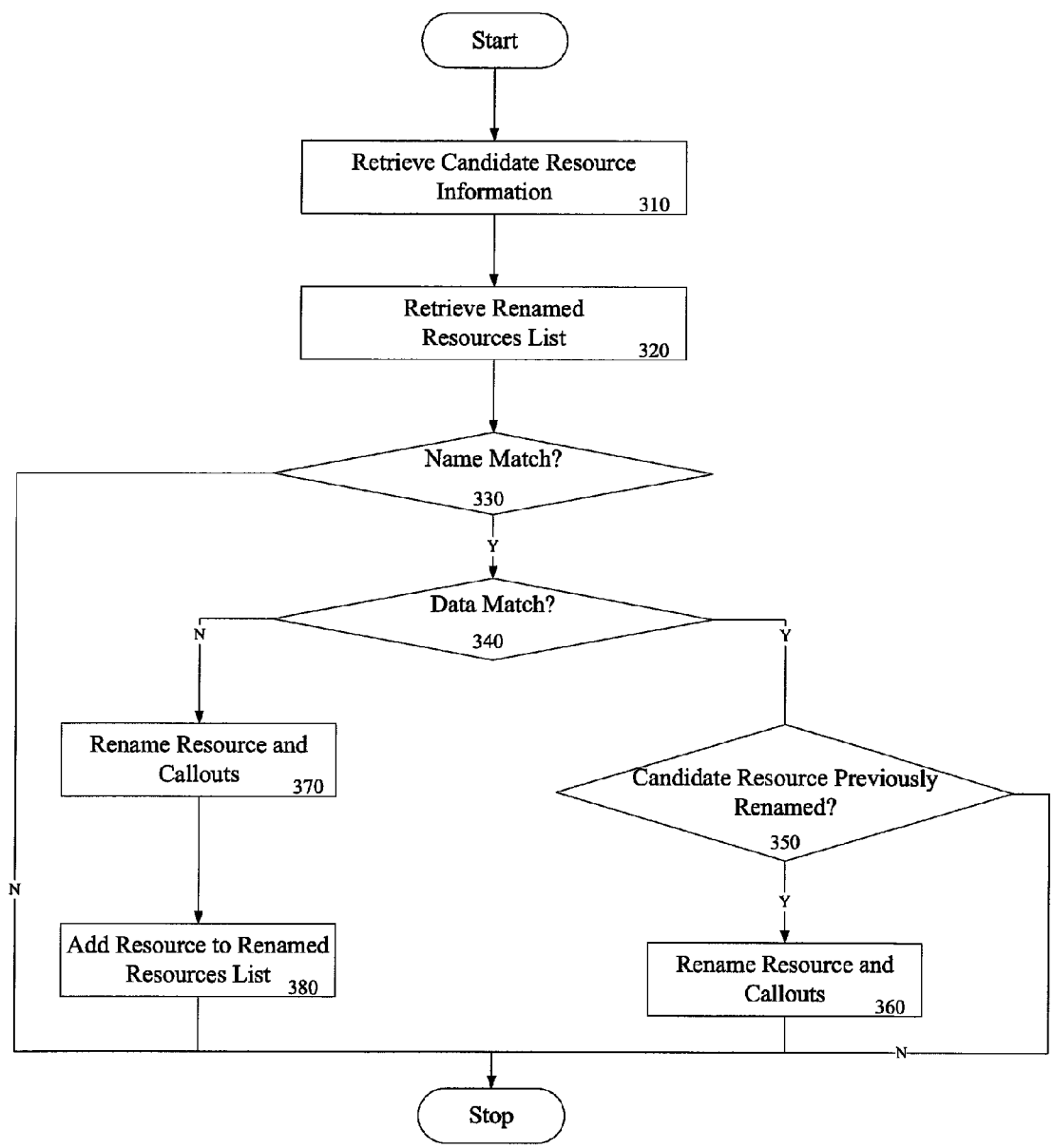

FIG. 3B is a flow diagram illustrating another embodiment of a resource rename process in which the order of processes 330-380 are rearranged. For instance, at decision block 330, it is determined whether there is an exact match between the name of the candidate resource and a name of a previously processed resource. If there is no name match, the rename process is terminated.

If there is an exact name match, it is determined whether there is also a match between the data of the candidate resource and the resource with the identical name, decision block 340. If the data matches, it is determined whether the candidate resource is identical to a resource that has already been renamed, processing block 350. If so, the resource and all callouts are renamed using the name of the identical resource on the list, processing block 360. If the candidate resource is not identical to a resource on the list, the rename process is terminated.

If at decision block 340, it is determined that there is not a match between the data of the candidate resource and the resource with the identical name, the resource and callouts are renamed, processing block 370. At processing block 380 the renamed resource is added to the list of previously renamed resources and the resource rename process is terminated.

Referring back to FIG. 2, control is returned to decision block 235 once the rename process has been completed, or it is determined at decision block 230 that the resource is not a rename candidate. At decision block 235, it is determined whether the current print file has more resources to be processed. If so, control is returned to processing block 215 where another resource is found.

Otherwise, all of the resources in the print file have been processed and it is determined whether the print job includes additional files, decision block 240. If the print job has additional files that are to be processed, control is returned to processing block 210 where the processing of another file is begun. If there are no additional files to process, the processed print files are combined, processing block 245. At processing 250, the combined print files are forwarded to printer 109 to be printed.

As described above, the conflict resolution process performs a cascade rename in addition to the renaming of a conflicted resource in order to rename resources (e.g., overlay callouts) that refer to a renamed resource. FIG. 4A illustrates two print files that demonstrates the cascade rename. As shown in FIG. 4A, print files 1 and 2 include identical resources CharacterSet C1, CodePage T1, CodedFont X1, Overlay O1 and Medium Map M1.

However, the data for T1, X1, O1 and M1 are identical, while there is a conflict between C1 for file 1 (CRC or MD5=1) and file 2 (CRC or MD5<>1=15). Because C1 is not identical in file 1 and file 2, C1 in file 2 must be renamed (e.g., C1N). Additionally, the X1, O1 and M1 resources in file 2 must also be renamed X1N, O1N and M1N, respectively, because they either directly or indirectly reference C1. For example, X1 (which references C1) must now refer to the renamed C1N resource. Similarly, since the file 2 X1 was renamed the file2 O1 must also be renamed because it references X1, and M1 now must be renamed because it references O1, which must be renamed.

Also described above, the printing software product does not change a resource name unless there is conflicting data between identical resources. However, in some instances the order of a file may subsequently reveal that a resource is to be changed after the resources have already been processed and a name change deemed unnecessary. FIG. 4B shows two print files which illustrate this problem.

As shown in FIG. 4B, the combined resource group would simply be: C1, T1, X1, 01 after processing, assuming that the C1 data in file 2 actually matched the C1 data in file 1 so that all resources are identical. However since the file 2 C1 does not match, the order of resources received in file 2 makes it impossible to know if O1 in file 2 needs to be renamed until completely processing file 2.

To prevent the multiple processing of most resources in the optimal case where no renames are required, file 2 is initially processed as if no renaming will occur. Thus, file 2 is written to output as C1 (from file 1), T1 (from file 1), X1 (from file 1), O1 (from file 2). Subsequently, T1 is processed. Since the data in T1 matches the file 1 T1 data it is not renamed. Similarly, X1 is not renamed because its data matches that of X1 in file 1.

However when C1 is processed, then it is determined that the data does not match. Accordingly, C1 and all references are renamed (e.g., C1N). Subsequently, the resources that call out to C1 are renamed, such that X1N now references C1N. Also, the overlay is renamed O1N because it previously referenced X1. The resulting output from processing file 1 and file 2 is: C1, T1, X1, O1, C1N, X1N and O1N. Note that O1 will exist in the output resource group, but there will be no references to it. Thus, additional resources are produced to maintain the optimal no rename scenario, while using little additional space for the cascade rename scenario.

Further, the renamed resources lists enables the conflict resolution mechanism to handle subsequent rename scenarios where subsequent files (e.g. file 3, file 4, . . . file N) use renames from file 2 if a resource in file 3 has a name and data match to the original resource from file 2. For example, a conflict between C1 in file 1 and file 3, would result in the file 2 C1 being renamed to C1N if the data in the file 3 C1 matches that of C1N renamed from file 2. This mechanism prevents N-1 copies of the same resource being renamed N-1 times to different names when there are only two different versions of the resources needed. Thus, the conflict resolution mechanism does not perform unnecessary processing on occasions where resources have identical names and data.

Figure 5:
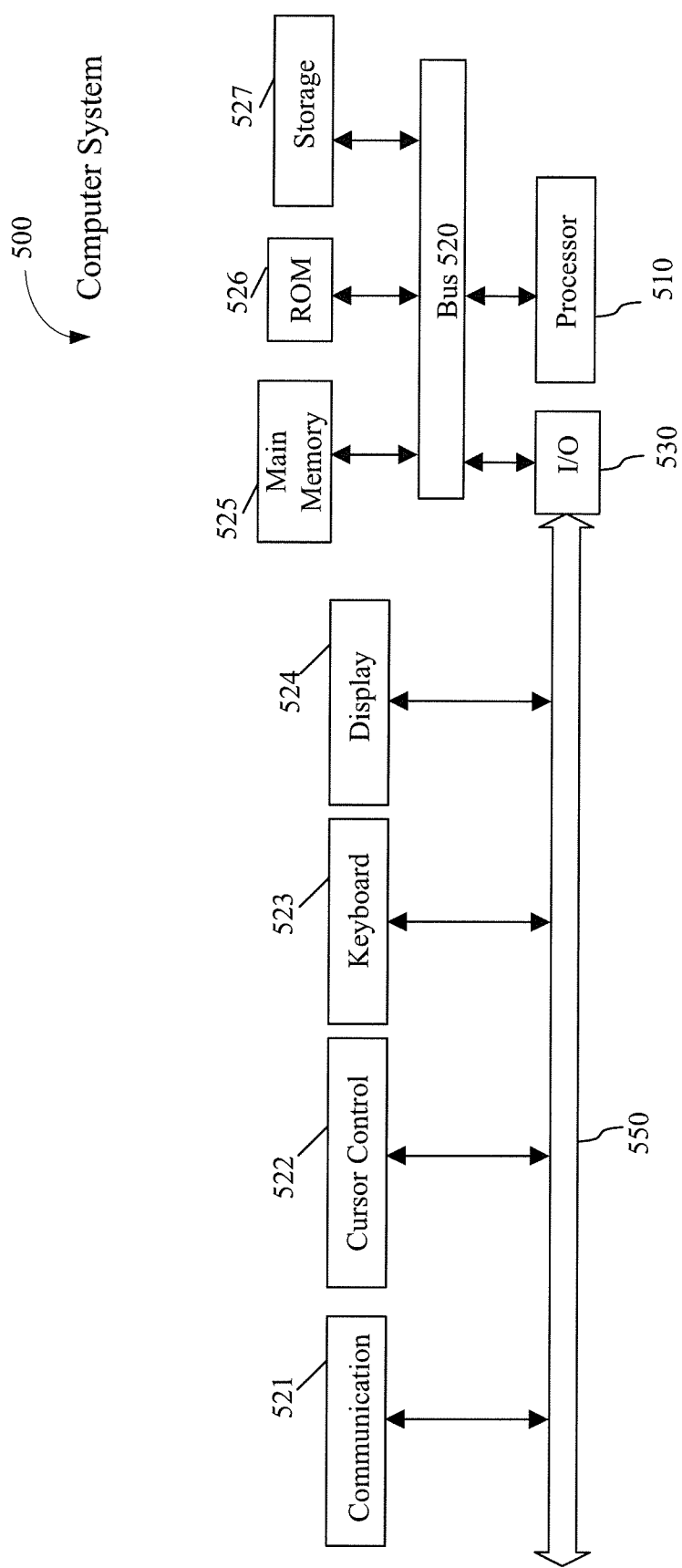
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer generated method comprising:
receiving a print job including a plurality of print files;
processing a first resource in a first print file by determining if the name of the first resource matches a name of a previously processed resource;
determining if data within the first resource matches data within a previously processed resource if the name of the first resource matches the name of the previously processed resource;
renaming the first resource if the data within the first resource does not match data within the previously processed resource;
determining if the first resource is identical to a previously renamed resource on a renamed resources list if the name of the first resource matches a name of a previously processed resource; and
renaming the first resource using the name of the identical resource on the renamed resources list.

2. The method of claim 1 further comprising processing the first resource without renaming if the first resource does not match a name of a previously processed resource.

3. The method of claim 1 further comprising adding the renamed first resource to a renamed resources list after renaming the first resource.

4. The method of claim 1 further comprising renaming all resources in the first print file that reference the renamed first resource.

5. The method of claim 1 further comprising processing a second resource in a second print file after all resources in the first file have been processed.

6. The method of claim 5 further comprising combining processed print files.

7. The method of claim 6 further comprising printing the processed print files.

8. A print server comprising a printing software product that receives a print job including a plurality of print files, processes a first resource in a first print file by determining if the name of the first resource matches a name of a previously processed resource, determines if data within the first resource matches data within a previously processed resource if the name of the first resource matches the name of the previously processed resource; renames the first resource if the data within the first resource does not match data within the previously processed resource, determines if the first resource is identical to a previously renamed resource on a renamed resources list prior to determining if the name of the first resource matches a name of a previously processed resource and renames the first resource using the name of the identical resource on the renamed resources list if the first resource is identical to a previously renamed resource.

9. The print server of claim 8 wherein the printing software product processes the first resource without renaming if the first resource does not match a name of a previously processed resource.

10. The print server of claim 8 wherein the printing software product adds the renamed first resource to a renamed resources list after renaming the first resource.

11. The print server of claim 8 wherein the printing software product renames all resources in the first print file that reference the renamed first resource.

12. The print server of claim 8 wherein the printing software product combines processed print files.

13. An article of manufacture comprising a non-transitory machine-readable medium including data that, when accessed by a machine, cause the machine to perform operations comprising:
receiving a print job including a plurality of print files;
processing a first resource in a first print file by determining if the name of the first resource matches a name of a previously processed resource;
determining if data within the first resource matches data within a previously processed resource if the name of the first resource matches the name of the previously processed resource;
renaming the first resource if the data within the first resource does not match data within the previously processed resource;
determining if the first resource is identical to a previously renamed resource on a renamed resources list if the name of the first resource matches a name of a previously processed resource; and
renaming the first resource using the name of the identical resource on the renamed resources list.

14. The article of manufacture of claim 13 when accessed by the machine, further cause the machine to perform operations comprising processing the first resource without renaming if the first resource does not match a name of a previously processed resource.

15. The article of manufacture of claim 13 when accessed by the machine, further cause the machine to perform operations comprising adding the renamed first resource to a renamed resources list after renaming the first resource.

16. The article of manufacture of claim 13 when accessed by the machine, further cause the machine to perform operations comprising:
determining if the first resource is identical to a previously renamed resource on a renamed resources list prior to determining if the name of the first resource matches a name of a previously processed resource if the first resource is identical to a previously renamed resource.

17. The article of manufacture of claim 13 when accessed by the machine, further cause the machine to perform operations comprising combining processed print files.

* * * * *